United States Patent [19]

Oosterling

[11] Patent Number: 5,832,868
[45] Date of Patent: Nov. 10, 1998

[54] METHOD AND A DEVICE FOR SURVEYING ANIMAL FUNCTIONS

[75] Inventor: Pieter Adriaan Oosterling, Nieuw-Vennep, Netherlands

[73] Assignee: Prolion B.V., Vijfhuizen, Netherlands

[21] Appl. No.: 522,276

[22] PCT Filed: Mar. 10, 1994

[86] PCT No.: PCT/NL94/00060

§ 371 Date: Oct. 31, 1995

§ 102(e) Date: Oct. 31, 1995

[87] PCT Pub. No.: WO94/19931

PCT Pub. Date: Sep. 15, 1994

[30] Foreign Application Priority Data

Mar. 11, 1993 [NL] Netherlands ............... 9300443

[51] Int. Cl.[6] ................................................. A01J 3/00
[52] U.S. Cl. ........................................ 119/14.2; 119/14.14
[58] Field of Search .............................. 119/14.02, 14.03, 119/14.01, 14.08, 14.14

[56] References Cited

U.S. PATENT DOCUMENTS

| | | | |
|---|---|---|---|
| 4,034,713 | 7/1977 | Umbaugh | 119/14.08 |
| 5,042,428 | 8/1991 | Van Der Lely et al. | 119/14.1 |
| 5,596,945 | 1/1997 | Van Der Lely | 119/14.03 |

FOREIGN PATENT DOCUMENTS

| | | | |
|---|---|---|---|
| 0091892 | 10/1983 | European Pat. Off. . | |
| 0188303 | 7/1986 | European Pat. Off. . | |
| 0189954 | 8/1986 | European Pat. Off. | 119/14.03 |
| 0320496 | 6/1989 | European Pat. Off. . | |
| 0439239 | 7/1991 | European Pat. Off. | 119/14.08 |
| 0551957 | 7/1993 | European Pat. Off. | 119/14.02 |

Primary Examiner—Edgar S. Burr
Assistant Examiner—Anthony H. Nguyen
Attorney, Agent, or Firm—Webb Ziesenheim Bruening Logsdon Orkin & Hanson, P.C.

[57] ABSTRACT

A method and a device for surveying animal functions by means of an animal manipulating apparatus such as a milking device, in particular a milking robot, provided with animal guiding members, animal contacting elements and/or animal nursing elements, wherein a programmable control system is used to control said elements in order to subject the animal to a predetermined sequence of operations, that is for instance, positioning, applying of teat cups, milking and subsequent or simultaneous feeding, checking the specific animal behaviour and removing the animal, wherein the operations to which the animal is subjected are programmed in respect of time and that at least one warning signal is generated by the control system if a time determined in the program for an operation is exceeded or not attained, in order to detect non-function or aberrant functions of the animal.

6 Claims, 1 Drawing Sheet

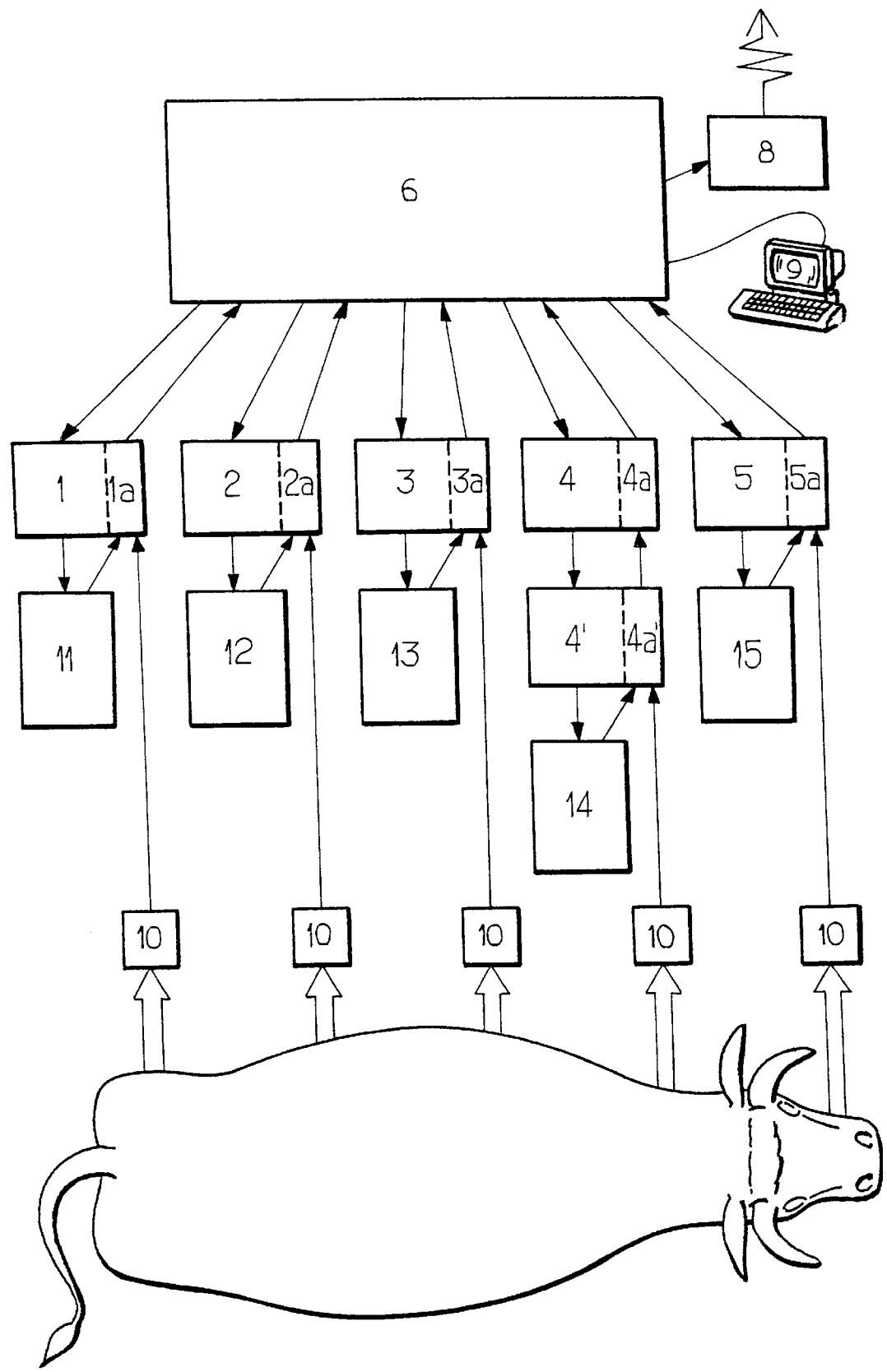

METHOD AND A DEVICE FOR SURVEYING ANIMAL FUNCTIONS

BACKGROUND OF THE INVENTION

The invention relates to a method for surveying animal functions by means of an animal manipulating apparatus such as a milking device, in particular a milking robot, provided with animal guiding members, animal contacting means and/or animal nursing means, wherein a programmable control system is used to control said means in order to subject the animal to a predetermined sequence of operations, that is for instance, positioning, applying of teat cups, milking and subsequent or simultaneous feeding, checking the specific animal behaviour and removing the animal.

It has become increasingly usual in the cattle farming industry to use program-controlled machines to manipulate animals. Particular reference can be made here to a milking robot, wherein the animal is guided wholly unattended via fence-like guide means to a manipulation location, making use of the Pavlovian behaviour of the animal, namely that a reward is provided in the form of feed. The animals herein display a type of behaviour which proceeds according to the same pattern during each operation, so that the device can be pre-programmed on the basis thereof. Such devices further have the possibility of checking particular occurring functions of the animal, whereby for instance a picture of the health of the animal can be established. It is for instance usual in the case of cows to detect draughtiness and diseases by means of a temperature sensor in milking systems.

The invention has for its object however to extend surveying to all animal functions, whereby it becomes possible using the programmed device to establish abnormal functions of the animal and to respond thereto. These malfunctions or abnormal functions can for instance be non-appearance at the programmed device as a result of external causes, for example breaking a leg. Other possibilities are the animal becoming entangled in the device, wherein the device can function per se normally.

SUMMARY OF THE INVENTION

The invention has for its object to provide a device wherein the above stated surveying can be performed in a simple manner. The device according to the invention is distinguished in that the operations to which the animal is subjected are programmed in respect of time and that at least one warning signal is generated by the control system if a time determined in the program for an operation is exceeded or not attained, in order to detect non-function or aberrant functions of the animal.

The invention is based on the idea that each operation on the animal requires a predetermined time, which time can per se differ per type of or per individual animal. Should the predetermined time be exceeded in the sequence of operations, the device, which can function per se well, then detects that there is something wrong with the function of the animal. Non-attainment of the predetermined time can also be an indication that something is wrong. This can happen when the milk production of the animal is too small, wherein the effective milking time is shorter than normal. Since such programmed devices are usually embodied with animal recognition means the supervisor, who does not have to be permanently present at the device, can be warned, whereafter he can take action.

A further improvement is obtained by a multiple signalling system for the supervisor, such as for instance a semaphone or a telephone paging device, wherein the supervisor is informed of the urgency of the call. Thus in the case of non-appearance of the animal the supervisor can still delay, while in the case of a break or the like he can take immediate action.

The invention is further elucidated in the figure description hereinbelow of an embodiment.

BRIEF DESCRIPTION OF THE DRAWING

An embodiment of a device according to the invention is shown in the accompanying DRAWING of a milking system for cows.

DESCRIPTION OF THE PREFERRED EMBODIMENT

The FIGURE shows schematically the-control of the system. Therein 6 is the central control system which is operated by means of terminal 9. The control system gives actuating signals to the different components of the device.

These components can consist among others of the mechanically movable guide means, such as fences 11, the identification system 12, the feeding system 13, the placing system 14 and the milking system 15 arranged in these systems are sensors which check the operation of each system, in particular whether the control signals have the desired result. Associated with each of these systems is a control system 1 to 5, wherein in the feed-back system 1a to 5a the signal processing of the operation of the sensors checking and controlling the system takes place. It is possible for the control system of a component of the device to be built up of multiple control groups, such as indicated at 4 and 4'.

The behaviour of the cow is detected with the sensors 10, the data from which is processed as sensor information in the control systems of the diverse components. This sensor information is moreover passed on to the central control system 6.

In the central control system the different sensor data is combined, whereby on the one hand the operation of the device is optimized and on the other hand the functions and state of health of the cow are detected, checked and analyzed. A comparison is made as to whether the functions correspond with the preprogrammed pattern of the relevant animal and with that which can be expected in the occurring situation. Should non-function or erroneous function be detected, the control system then establishes that the supervisor must be warned, wherein a choice is also made from a number of possible types of message. Using the paging system 8, for instance a semaphone installation or combination wireless transmitter and remotely located receiver, the supervisor is warned and informed of the steps taken and the urgency of the message.

The steps can differ herein in accordance with the time at which the detection is made; aberrations for which the cow is kept in the milking parlour during the day and the supervisor is paged will only result during the night in the animal being separated. Paging of the supervisor can also be accompanied by an indication of the urgency thereof: in situations where the cow is standing quietly in the milking parlour there is little urgency, while for instance the passageway being blocked for 15 minutes without there being an apparent reason therefor is an urgent situation.

Examples of situations wherein warning signals are generated by the control system and the possible responses thereto are given below, wherein this enumeration is not limiting for the options to be included in the programming.

The amount of milk a cow gives per cycle can be converted to a time indication. If the difference is for instance 25% less than the expected amount the supervisor is warned. If all teats are connected to the milking system and no milk comes from one of the quarters, also after repeated connecting, this likewise gives cause to warn the supervisor.

Signalling is also possible as to whether the cow has arrived at the milking parlour. If for instance the second milking period in a day is between 8.00 o'clock and 11.00 o'clock in the morning and at 10.00 a o'clock of cows have not yet appeared, the supervisor then receives a signal that one or more cows have yet to appear. This can for instance be printed out on a printer. Five to ten minutes before the period has elapsed the supervisor is warned if there are then still animals which have not yet been milked. He can then investigate the reasons why the relevant animals have not gone to the milking parlour.

If an animal is detected, and optionally identified, in the passageway to the milking parlour, and has not arrived in the milking parlour after for instance 15 minutes, then there is a problem with the animal. The supervisor is warned; the relevant section is closed off;

milking is stopped and the system cleaned and the fences opened.

It may also occur that an animal is particularly restless, for instance because it is in pain. The system detects this by the high frequency of the movements, for instance during arranging of the milking cluster and/or the movements of a leg. If this restlessness is not extreme the cow can be led into a separation stall. If on the other hand the restlessness is considerable, the cow can then remain standing and the supervisor is warned.

Other situations in which the control system signals that something is wrong with a cow are:

The cow becomes unwell and lies in the parlour or at the entrance or exit.

The cow stands the wrong wait round in the parlour.

The cow is jammed with head or body between fence, feeding fence and the like.

The cow has slipped and broken a leg.

The cow has pushed over one of the fences and is lying among the debris

Below are situations which can be detected in terms of time:

The fence is open, the presence of the cow is signalled but identification at the feeding fence is not forthcoming.

The cow does not leave the milking parlour.

The cow does not eat from the feed trough.

There are no teats or no udder to detect.

The fences do not close or will not open, caused by the presence of the cow.

The moving mechanism of the milking device is blocked.

The above situations result in signals to the supervisor which may or may not differ. For example, warning signals of differing strength may be generated depending on exceeding of the predetermined time in a determined program location. Essential however is that the above stated aberrations are not related to the operation of the programmed device itself but to the manner in which the animal functions in such a device.

The invention is not limited to the above described embodiment.

I claim:

1. A method for surveying animal behavior by an animal manipulating appliance having at least one of animal guiding means, animal contacting means, animal feeding means and animal milking means, said method comprising the steps of:

controlling said appliance to subject the animal to a predetermined sequence of operations;

sensing a response of one or more sensors connected to detect the operation of at least one of the animal guiding means, the animal contacting means, the animal feeding means and the animal milking means;

recording as a function of time the response of the one or more sensors as a function of the operation of the at least one of the animal guiding means, the animal contacting means, the animal feeding means and the animal milking means;

determining a difference between the recorded response of the one or more sensors as a function of time and a predetermined response as a function of time; and generating a warning signal as a function of the determined difference, wherein the predetermined response corresponds to an operation of the at least one of the animal guiding means, the animal contacting means, the animal feeding means and the animal milking means in response to a predetermined pattern of behavior of the animal; and the one or more sensors detect the operation of the at least one of the animal guiding means, the animal contacting means, the animal feeding means and the animal milking means during the interaction thereof with the animal.

2. The method as claim in claim 1, further including the step wirelessly transmitting the warning signal to a remotely located receiver.

3. The method as claimed in claim 2, wherein warning signals of different strength are generated depending on the extent of the determined difference.

4. the method as claimed in claim 1, wherein different warning signals are generated depending on the extent of the determined difference.

5. The method as claimed in claim 1, wherein warning signals of different types are generated depending on the extent of the determined difference.

6. The method as claimed in claim 2, wherein warning signals of different types are generated depending on the extent of the determined difference.

* * * * *